US012124537B2

(12) United States Patent
Santhar et al.

(10) Patent No.: US 12,124,537 B2
(45) Date of Patent: Oct. 22, 2024

(54) TRAINING AN ENVIRONMENT GENERATOR OF A GENERATIVE ADVERSARIAL NETWORK (GAN) TO GENERATE REALISTIC ENVIRONMENTS THAT INCORPORATE REINFORCEMENT LEARNING (RL) ALGORITHM FEEDBACK

(71) Applicant: International Business Machines Corporation, Armonk, NY (US)

(72) Inventors: Sathya Santhar, Ramapuram (IN); Sridevi Kannan, Chennai (IN); Kothagorla Lakshmana Rao, Chirala (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 17/567,718

(22) Filed: Jan. 3, 2022

(65) Prior Publication Data
US 2023/0214453 A1 Jul. 6, 2023

(51) Int. Cl.
*G06F 18/214* (2023.01)
*G06F 18/21* (2023.01)
*G06N 3/045* (2023.01)

(52) U.S. Cl.
CPC ...... *G06F 18/2148* (2023.01); *G06F 18/2178* (2023.01); *G06N 3/045* (2023.01)

(58) Field of Classification Search
CPC .. G06F 18/2148; G06F 18/2178; G06N 3/045
See application file for complete search history.

(56) References Cited

U.S. PATENT DOCUMENTS

2019/0050726 A1* 2/2019 Azaria ................. G06F 16/248
2019/0126472 A1 5/2019 Tunyasuvunakool et al.
(Continued)

FOREIGN PATENT DOCUMENTS

WO 2020216431 A1 10/2020

OTHER PUBLICATIONS

Sarmad et al., "RL-GAN-Net: A Reinforcement Learning Agent Controlled GAN Network for Real-Time Point Cloud Shape Completion," arXiv, 2019, 21 pages, received from https://arxiv.org/pdf/1904.12304.pdf.
(Continued)

*Primary Examiner* — Austin Hicks
(74) *Attorney, Agent, or Firm* — Zilka-Kotab, P.C.

(57) ABSTRACT

A computer-implemented method according to one embodiment includes causing an environment generator of a Generative Adversarial Network (GAN) to generate realistic training environments, and causing a first discriminator of the GAN to determine whether the realistic training environments are real or fake. In response to a determination that an accuracy of the first discriminator at determining whether the realistic training environments are real or fake is within a predetermined range, the environment generator is caused to generate a first realistic environment. The method further includes causing the first realistic environment to be shared with an agent of a reinforcement learning (RL) algorithm and a second discriminator, and receiving, from the agent of the RL algorithm and the second discriminator, feedback associated with the first realistic environment. The environment generator is caused to generate a second realistic environment based on the feedback associated with the first realistic environment.

19 Claims, 7 Drawing Sheets

(56) References Cited

U.S. PATENT DOCUMENTS

| | | | |
|---|---|---|---|
| 2020/0065673 A1 | 2/2020 | Huang et al. | |
| 2020/0234144 A1 | 7/2020 | Such et al. | |
| 2022/0366264 A1* | 11/2022 | Moradi | G06N 3/047 |
| 2023/0214725 A1* | 7/2023 | Hu | G06N 3/092 |
| | | | 706/12 |

OTHER PUBLICATIONS

Zhao et al., "Simulating User Feedback for Reinforcement Learning Based Recommendations," arXiv, 2019, 10 pages, retrieved from https://arxiv.org/pdf/1906.11462.pdf.

Florensa et al., "Automatic Goal Generation for Reinforcement Learning Agents," Proceedings of the 35th International Conference on Machine Learning, 2018, 14 pages, retrieved from https://arxiv.org/pdf/1705.06366.pdf.

Kim et al., "Learning to Simulate Dynamic Environments with GameGAN," arXiv, 2020, 16 pages, retrieved from https://arxiv.org/pdf/2005.12126.pdf.

* cited by examiner

TRAINING AN ENVIRONMENT GENERATOR OF A GENERATIVE ADVERSARIAL NETWORK (GAN) TO GENERATE REALISTIC ENVIRONMENTS THAT INCORPORATE REINFORCEMENT LEARNING (RL) ALGORITHM FEEDBACK

BACKGROUND

The present invention relates to Reinforcement Learning (RL), and more specifically, this invention relates to using a Generative Adversarial Network (GAN) to generate a realistic and challenging environment for RL agents to navigate while an appropriate level of difficulty is maintained for the RL agent to receive relatively frequent rewards.

RL is a subfield of Machine Learning (ML), but is also a general-purpose formalism for automated decision-making and Artificial Intelligence (AI). Moreover, RL involves taking suitable action to maximize reward in a particular situation. RL is employed by various software and machines to find a "best possible" behavior or path for the software and/or machines to take in a specific situation. RL can be viewed as an approach which falls between supervised and unsupervised learning. Strictly supervised does not occur because RL does not rely only on a set of labelled training data, however, unsupervised learning does not occur because there is a reward which the agent aims to maximize. More specifically, the agent aims to find the "right" actions to take in different situations such that an overall goal of the agent is achieved.

There are three basic concepts in typical reinforcement learning: state, action, and reward. An algorithm (agent) evaluates a current situation (state), takes an action, and receives feedback (reward) from the environment after each act. Positive feedback is a reward, and negative feedback is punishment for making a mistake.

SUMMARY

A computer-implemented method according to one embodiment includes causing an environment generator of a Generative Adversarial Network (GAN) to generate realistic training environments, and causing a first discriminator of the GAN to determine whether the realistic training environments are real or fake to train the environment generator to generate realistic environments. In response to a determination that an accuracy of the first discriminator at determining whether the realistic training environments are real or fake is within a predetermined range, the environment generator is caused to generate a first realistic environment. The method further includes causing the first realistic environment to be shared with an agent of a reinforcement learning (RL) algorithm and a second discriminator, and receiving, from the agent of the RL algorithm and the second discriminator, feedback associated with the first realistic environment. The environment generator is caused to generate a second realistic environment based on the feedback associated with the first realistic environment.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
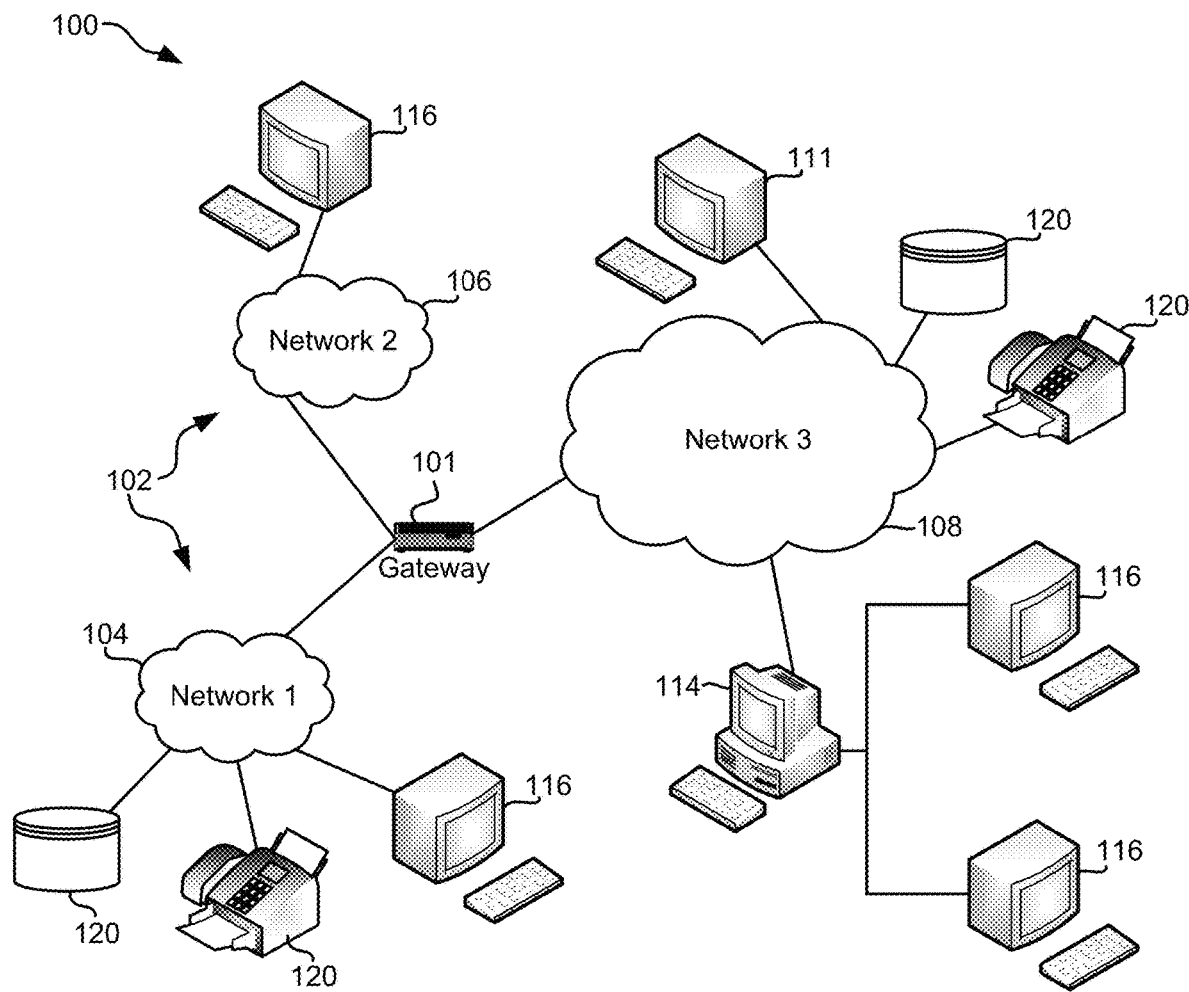
FIG. 1 is a diagram of a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using a GAN to generate a realistic and challenging environment for RL agents to navigate while an appropriate level of difficulty is maintained for the RL agent to receive relatively frequent rewards.

In one general embodiment, a computer-implemented method includes causing an environment generator of a Generative Adversarial Network (GAN) to generate realistic training environments, and causing a first discriminator of the GAN to determine whether the realistic training environments are real or fake to train the environment generator to generate realistic environments. In response to a determination that an accuracy of the first discriminator at determining whether the realistic training environments are real or fake is within a predetermined range, the environment generator is caused to generate a first realistic environment. The method further includes causing the first realistic environment to be shared with an agent of a reinforcement learning (RL) algorithm and a second discriminator, and receiving, from the agent of the RL algorithm and the second discriminator, feedback associated with the first realistic environment. The environment generator is caused to generate a second realistic environment based on the feedback associated with the first realistic environment.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
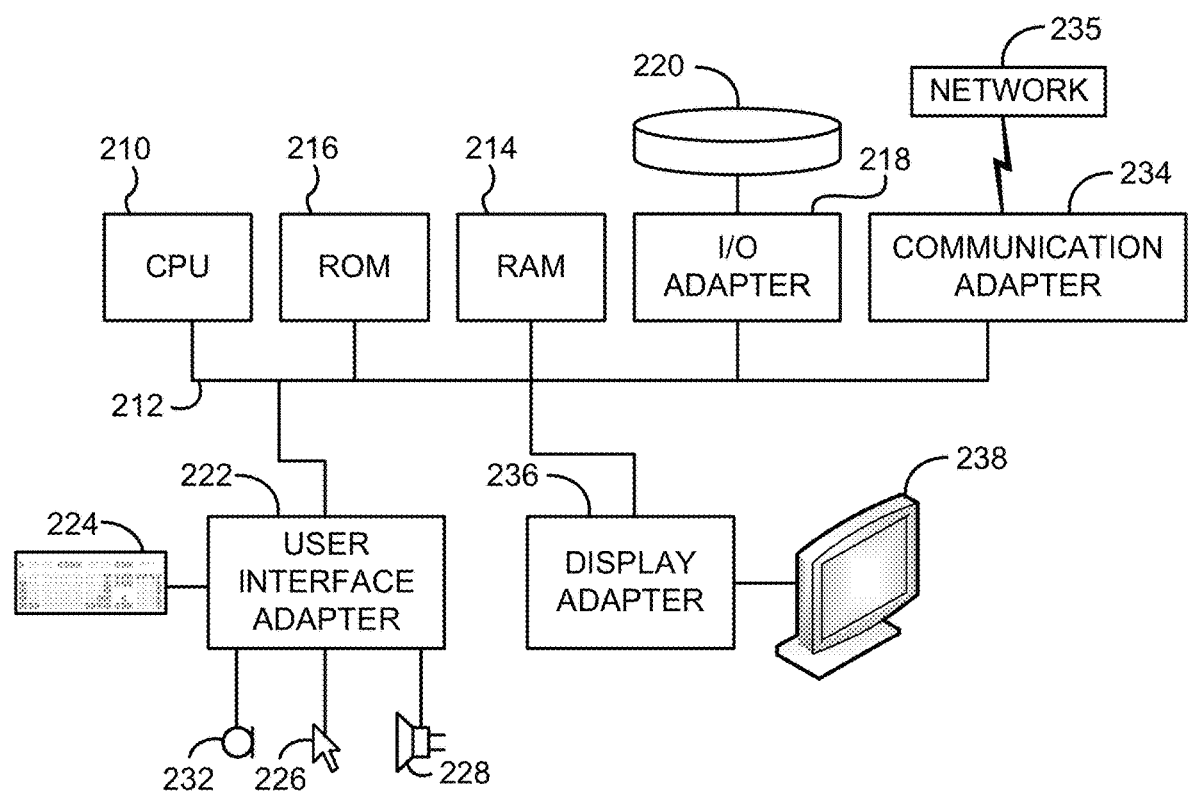
FIG. 2 is a diagram of a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned elsewhere above, RL is a subfield of ML, but is also a general-purpose formalism for automated decision-making and AI. Moreover, RL involves taking suitable action to maximize reward in a particular situation. RL is employed by various software and machines to find a "best possible" behavior or path for the software and/or machines to take in a specific situation. RL can be viewed as an approach which falls between supervised and unsupervised learning. Strictly supervised does not occur because RL does not rely only on a set of labelled training data, however, unsupervised learning does not occur because there is a reward which the agent aims to maximize. More specifically, the agent aims to find the "right" actions to take in different situations such that an overall goal of the agent is achieved.

There are three basic concepts in typical reinforcement learning: state, action, and reward. An algorithm (agent) evaluates a current situation (state), takes an action, and receives feedback (reward) from an environment after each act, where positive feedback is a reward, and negative feedback is punishment for making a mistake. Environments are functions that transform an action taken in the current state into the next state and a reward. Agents are functions that transform the new state and reward into the next action.

RL represents an attempt of an agent to approximate a function of an environment, such that actions may be sent into the black-box environment that maximize the rewards that is output. However, data for RL is collected via running an agent in the desired environment, and for applications like robotics, running a robot in the real world may be extremely costly and time consuming. Similarly, sparse reward functions are difficult to be handled by the RL agent as the training becomes a slower process and there is not regular feedback to the RL agent from the environment.

Currently when there is a scarce training data set available, such as in most of real-world scenarios, conventional techniques are unable to simulate a challenging real world environment for an RL agent to navigate.

GANs of machine learning involve generative modelling using deep learning methods, such as Convolutional Neural Networks (CNNs). Moreover, GANs involve techniques for training a generative model by framing a problem as a supervised learning problem with two sub-models. The first sub-model, e.g., the generator model, is trained to generate new examples, while the second sub-model, e.g., the discriminator model, attempts to classify the generated examples as either real (from the domain) or fake (generated). The two sub-models are trained together in a zero-sum game, adversarial, until the discriminator sub-model is fooled, e.g., incorrectly classifies the generated examples, about half the time. The discriminator sub-model being fooled about half the time translates to the generator model generating plausible examples. Based on this, GAN are applicable in the tasks of new video generation and next frame prediction.

Within the application of RL, it is useful to understand both the utility and challenges of learning agents that are configured to make decisions. This is particularly true in that interactive agents and intelligent decision-making is integrated into different environments. One key goal of RL is to define a sequence of decisions, e.g., a "best" sequence of decisions, which allow the agent to solve a problem while maximizing a long-term reward. This set of coherent actions is learned through the agent's interaction with an environment and observation of rewards in every state. Currently, there are numerous challenges involved in implementing RL for solving a problem, e.g., such as environment unpredictability, learning on a real system from limited samples, etc. This is because RL is a technique that is exploratory in nature. For example, the agent relies on collecting data on the go because there is no labelled or unlabeled data to guide the agent with a task goal. Moreover, the decisions made by the agent influence the data that is received. Accordingly, the agent may try out different actions to get new data.

With regards to the challenge of environmental unpredictability faced in the RL field, an RL algorithm may perform exceptionally when trained in closed, synthetic environments. In video games, for example, conditions under which the agent repeats a decision process do not change. This is not the case with respect to conditions of the real world despite it being important to have an RL agent trained on a wide range of environments that the RL agent may witness in the real world. Accordingly, for these reasons, industries such as finance, insurance, healthcare, etc., are reluctant to invest money into trials of RL-based systems.

With regards to the challenge of limited data sample availability for training purposes, RL agents typically completely rely on the data samples that the agents are trained on. However, almost all real-world systems are either slow moving, fragile, or expensive enough that the data they produce is costly. This is problematic because data efficiencies are important in policy learning. Accordingly, in order to achieve an efficient and relatively quick training phase of the RL agent (algorithm), it is important to have challenging and real-world environments available for the training process.

Another challenge faced in the RL field is sparce rewards. Crafting reward functions for RL models is not an easy task. If only sparse rewards are achieved, agents are not rewarded very often. Accordingly, in response to the agent only being rewarded when the agent completes only the fixed task, all the time that the agent is off exploring distant tasks, the agent is unlikely to receive any feedback. This makes for a relatively much longer training time. Reward shaping is important in that the agent receives gradual feedback that allows the agent to improve behavior accuracies. This in turn enables the agent to learn and be trained in a relatively quicker amount of time than would otherwise occur where the agent receives relatively few rewards.

RL represents an attempt by the agent to approximate a function of the environment, such that actions may be sent into a black-box environment that maximize the rewards output by the black-box environment. However, data for RL is collected via running an agent in a desired environment. For applications like robotics, running a robot in the real world may be extremely costly and time consuming. Similarly, sparse reward functions are difficult for the RL agent to handle as the training becomes a slower process and regular feedback is not provided to the RL agent from the environment.

Typically, when only a scarce training data set is available, e.g., as witnessed in most real-world scenarios, conventional techniques are unable to simulates a challenging real world environment for a RL agent to navigate. Accordingly, conventional RL agents are unable to integrate such a challenging real world environment to thereby match an appropriate level of difficulty that would result in the agent earning a reward, which in turn prevents training from being completed in a relatively practical amount of time.

In sharp contrast to the deficiencies of the various conventional techniques described above, various embodiments described herein enable a RL environment generator based on GAN to capture the complex distribution of any real-world data and generate a realistic environment to enrich a training dataset. In the process of realistic environment generation, the proposed system ensures that the appropriate level of difficulty is maintained while generating the environment for the agent to navigate. Simulated environment data becomes useful because challenging and suitable environments are generated which may offer an appealing alternative for a real-world environment. Furthermore, the policies trained in the simulation process may be transferred effectively into the real world with some existing additional machinery and techniques.

Figure 3A:
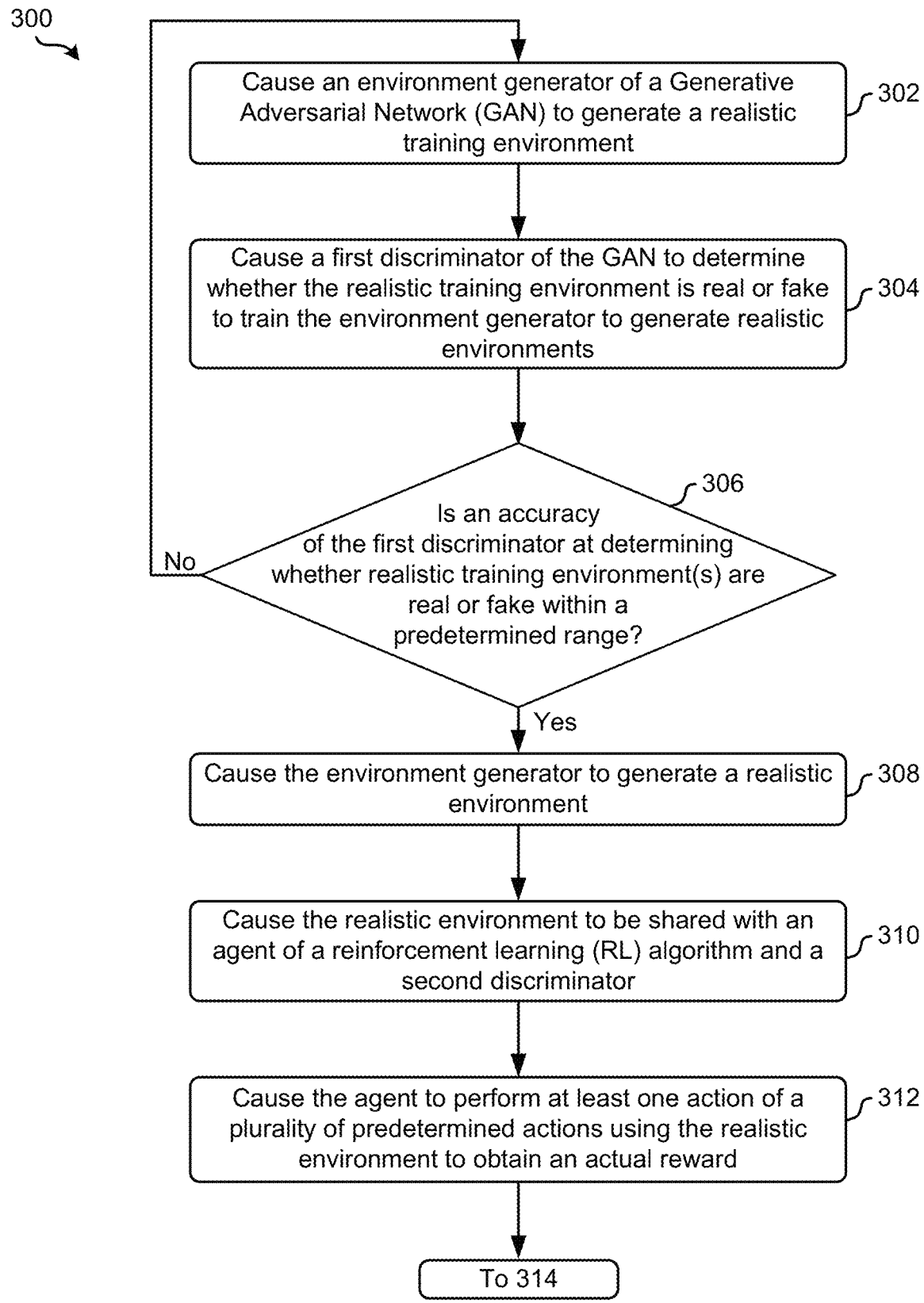
FIG. 3A is a flowchart of a method, in accordance with one embodiment.
Figure 3A:
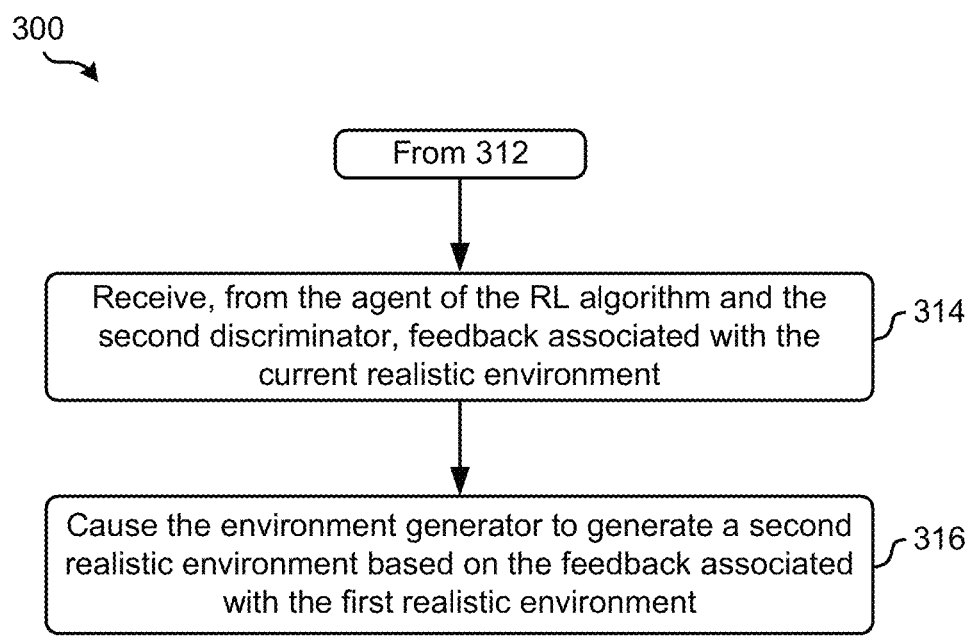

Now referring to FIG. 3A, a flowchart of a method 300 is shown according to one embodiment. The method 300 may be performed in accordance with the present invention in any of the environments depicted in FIGS. 1-4, among others, in various embodiments. Of course, more or fewer operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Operation 302 includes causing an environment generator of a GAN to generate a realistic training environment. The GAN and known variants of the GAN may be utilized to generate the realistic training environment which may include fake but realistic images and/or data. This generation of the realistic training environment is useful because it enables modelling of complex distributions. The generated output may be considered as augmentations of real-world data to enlarge a data space that is used as a training dataset. In order to achieve this utility, the environment generator may be trained to be a RL environment generator based on GAN to capture the complex distribution of any real-world data and generate realistic environment to enrich the training dataset. In one approach, in order to train the environment generator to generate realistic environments, a first discriminator of the GAN is caused to determine whether the realistic training environment is real or fake, e.g., see operation 304. The first discriminator may be of a known type.

In some preferred approaches, the process of training the environment generator to generate realistic environments may include more than one realistic training environment being generated and considered by the first discriminator. In one or more of such approaches, realistic training environments may be generated and considered by the first discriminator until it is determined that the first discriminator has achieved a predetermined accuracy of determining whether realistic training environments are real or fake. For example, decision 306 includes determining whether an accuracy of the first discriminator at determining whether realistic training environment(s) are real or fake is within a predetermined range. Although in some approaches, a preferred accuracy of the first discriminator when determining whether realistic training environments are real or fake is about 50%, various illustrative examples of predetermined ranges that may be used in decision 306 include, e.g., 49%-51%, 45%-55%, 35%-65%, 30%-70%, at least 25%, at least 49%, greater than about 50%, at least 75%, etc. In response to a determination that the accuracy of the first discriminator is not within the predetermined range, the environment generator of the GAN may be caused to generate one or more additional realistic training environments that are considered by the first discriminator, e.g., as illustrated by the "No" logical path of decision 306 return to operation 302 of method 300. For example, the environment generator may be caused to generate a second realistic training environment, and the first discriminator may be caused to determine whether the second realistic training environment is real or fake. This process may in some approaches repeat until it is determined that the accuracy of the first discriminator at determining whether realistic training environment(s) are real or fake is within the predetermined range. More specifically, subsequent to each iteration of one or more generated realistic training environments being determined to be real or fake, results of the determination of may be backpropagated as feedback to the environment generator. Accordingly, in some approaches, the environment generator may use results of each determination to generate a next one of the plurality of realistic training environments. This way, in response to a determination that the discriminator is struggling to achieve an accuracy within the predetermined range, a difficulty of the generated environment may be decreased. For example, an initial one of the generated realistic training environments may include a nominal/default predetermined level of difficulty. In response to a determination that the first discriminator has not correctly determined whether a generated realistic training environments is real or fake for a predetermined number of iterations, the difficulty may be decreased a predetermined amount using known techniques. In contrast, in response to a determination that the first discriminator has correctly determined whether a generated realistic training environments is real or fake for a predetermined number of iterations, the difficulty may be increased a predetermined amount using known techniques.

In response to a determination that the accuracy of the first discriminator at determining whether realistic training environment(s) are real or fake is within the predetermined range, e.g., as illustrated by the "Yes" logical path of decision 306, it may be determined that the environment generator has been trained to generate realistic environments. Accordingly, method 300 includes causing the environment generator to generate a first realistic environment, e.g., see operation 308. Known techniques may be implemented for causing the environment generator to generate the first realistic environment.

Operation 310 of method includes causing the first realistic environment to be shared with an agent of a RL algorithm. It should be prefaced that in the process of realistic environment generation, the techniques of various embodiments and approaches described herein ensure that a sufficient level of difficulty is maintained while generating the realistic environment for the agent of the RL algorithm to navigate. In some approaches, this level of difficulty may be, at least in part, evaluated based on whether the agent of the RL algorithm receives a reward as a result of interacting with the generated realistic environment. For example, operation 312 includes causing the agent of the RL algorithm to perform at least one action of a plurality of predetermined actions using the first realistic environment to obtain an actual reward. More specifically, the agent preferably evaluates a current situation, e.g., state of the first realistic environment, takes an action of the predetermined actions, and potentially receives feedback, e.g., a reward, from the environment after each action. The at least one action of the plurality of predetermined actions may be a best action that is determined using known techniques. It should be noted that in some approaches, an actual reward is not received as a result of the agent of the RL algorithm performing at least one action of the plurality of predetermined actions using the first realistic environment.

The first realistic environment is additionally and/or alternatively caused to be shared with a second discriminator of the GAN, e.g., see operation 310. The second discriminator may be a known type of discriminator. In some approaches the first realistic environment may be caused to be shared with the second discriminator at about the same time that the first realistic environment is caused to be shared with the agent of the RL algorithm. In some other approaches, the first realistic environment may be caused to be shared with the second discriminator at a different time than a time that the first realistic environment is caused to be shared with the agent of the RL algorithm, e.g., a predetermined amount of time after, a predetermined amount of time before, etc. The second discriminator may use the first realistic environment to evaluates feedback that is received by the second discriminator from the RL algorithm agent. The actual reward of the RL algorithm agent may in some approaches be backpropagated via a feedback loop to the second discriminator of the GAN Network. In some approaches, the actual reward includes a plurality of key points. For example, as a result of the RL algorithm agent performing one of more of the predetermined actions, the reinforcement learning algorithm agent may obtain fifty key points out of one-hundred key points that are incorporated into the realistic environment. In such an approach, the fifty key points are the actual reward, and the obtained fifty points are backpropagated to the second discriminator.

The second discriminator may be configured to act as a classifier in some approaches. More specifically, the second discriminator may be configured to receive information associated with a generated environment, and use the information to calculate a confidence score of the generated environment. For example, in some preferred approaches, subsequent to receiving information associated with the generated environment, e.g., the actual reward from the reinforcement learning algorithm, an expected reward which may be received from a user device and/or the environment generator, the generated environment, etc., method 300 includes causing a confidence score to be generated that includes a numerical score of difficulty of the first realistic environment and a determination whether a degree of difficulty incorporated into the first realistic environment is correct. As will be described in greater detail elsewhere herein, the confidence score may be backpropagated as the feedback and used to generate a next realistic environment, and therefore the confidence score may serve as a grade of whether a degree of difficulty incorporated into a most recently considered generated realistic environment is correct. Specifically, a correct level of difficulty incorporated into a generated realistic environment is one that is not difficult to a degree that the RL algorithm agent is not infrequently receiving an actual reward when navigating the generated realistic environment, which would otherwise result in a substantially time consuming process for the RL algorithm agent to navigate the generated realistic environment to an extent that an actual reward is received. In contrast, the correct level of difficulty incorporated into the generated realistic environment is additionally and/or alternatively one that is not lacking in difficult to a degree that an actual reward is not received as a result of the RL algorithm agent navigating the generated realistic environment. Various techniques for causing the confidence score to be generated are described below.

In some preferred approaches, the confidence score is based on the actual reward obtained by the agent of the RL algorithm. For example, the confidence score may be calculated by comparing the actual reward with an expected reward for a given generated realistic environment. The numerical score of difficulty portion of the confidence score may in some approaches be a ratio of the actual reward and the expected reward. For example, assuming that the actual reward includes fifty key points, and the expected reward is one hundred key points, the numerical score is ½ and/or 50%. Furthermore, the determination whether the degree of difficulty incorporated into the first realistic environment is correct may in some approaches be based on the calculated numerical score of difficulty. For example, the numerical score of difficulty may be compared with a predetermined bottom threshold of difficulty and/or a predetermined top threshold of difficulty. In response to a determination that the numerical score of difficulty is less than the predetermined bottom threshold of difficulty and/or in response to a determination that the numerical score of difficulty is greater than the predetermined top threshold of difficulty, the degree of difficulty incorporated into the first realistic environment may be determined to be incorrect. In contrast, in response to a determination that the numerical score of difficulty is greater than the predetermined bottom threshold of difficulty and/or in response to a determination that the numerical score of difficulty is greater than the predetermined top threshold of difficulty, the degree of difficulty incorporated into the first realistic environment may be determined to be correct. In another approach, a predetermined threshold of closeness may be used to determine whether the degree of difficulty incorporated into the first realistic environment is correct. For example, in response to a determination that the results of the comparison indicate that the actual reward and the expected reward are relatively close in value, e.g., within a predetermined threshold of closeness, to one another, the degree of difficulty incorporated into the first realistic environment may be determined to be correct. In contrast, in response to a determination that the results of the comparison indicate that the actual reward and the expected reward are not relatively close in value, e.g., not within the predetermined threshold of closeness, to one another, the degree of difficulty incorporated into the first realistic environment may be determined to be incorrect. Note that in some approaches, these thresholds may be adjusted to be relatively stricter, e.g., calling for a relatively greater degree of difficulty to be present in a generated environment that is considered by the agent of the RL algorithm, in each iteration of a realistic environment being navigated. This way, the agent is trained on an increasing scale of incorporated difficulty such that the agent receives gradual feedback that allows the agent to improve behavior accuracies.

A predetermined list may additionally and/or alternatively be used to cause the confidence score to be generated in some other approaches. For example, the numerical score of difficulty portion of the confidence score may in some approaches be calculated by determining a difference of the expected reward and the actual reward. A list that includes numerical scores that are each pre-associated with a different potential difference in value may be referenced to determine the numerical score. In such a list, relatively higher numerical scores may be pre-associated with approaches in which the value of the actual reward is relatively close to the value of the expected reward for the generated environment, while relatively lower numerical scores may be pre-associated with approaches in which the value of the actual reward is not relatively close to the value of the expected reward for the generated environment. Note that in one or more of such approaches, the numerical score of difficulty may be a value of a predetermined range, e.g., 0-10%, 1-100%, 1-1000%, etc.

Figure 3B:
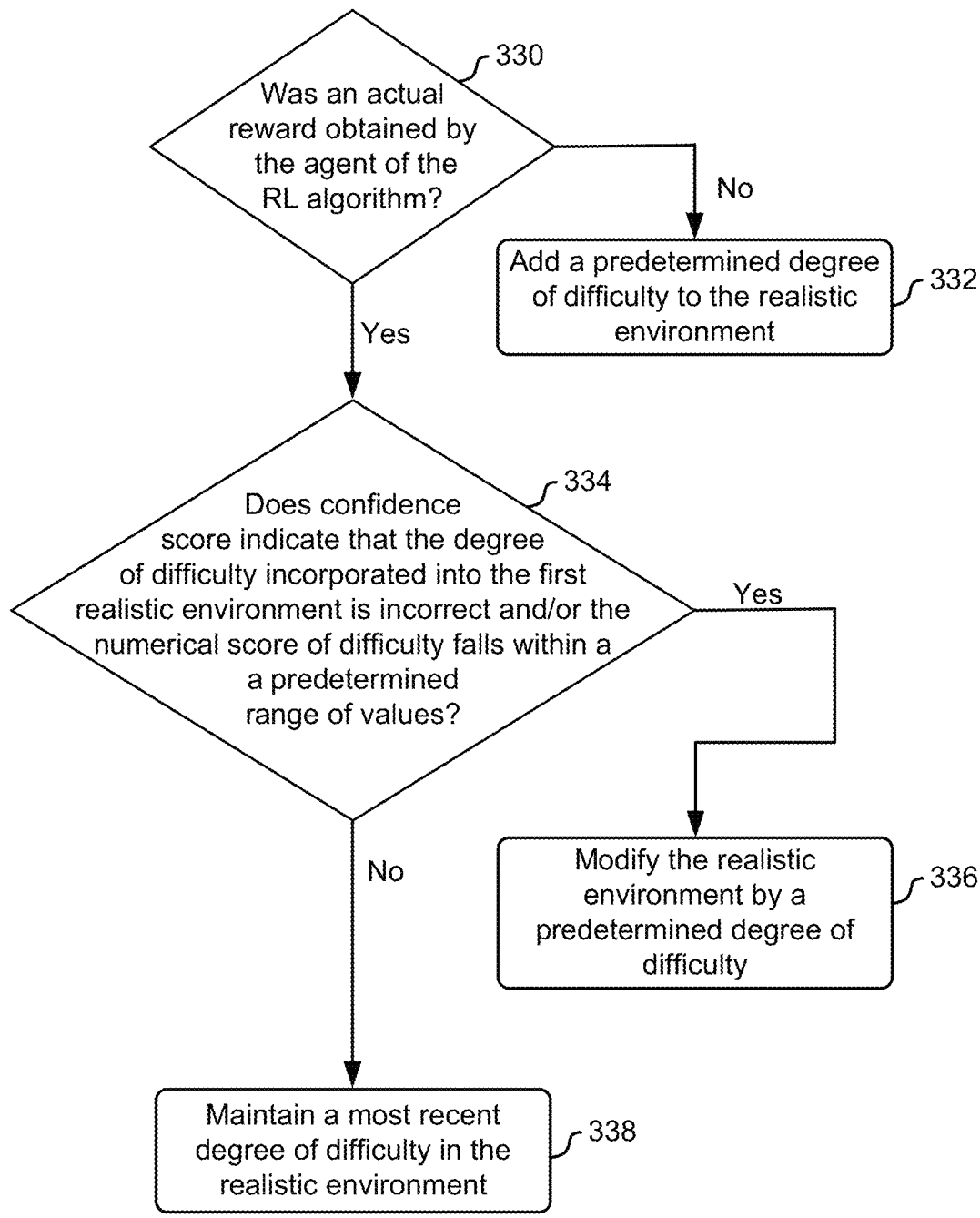
FIG. 3B is a flowchart of sub-operations of an operation of the flowchart of the method of FIG. 3A, in accordance with one embodiment.

Operation 314 includes receiving from the agent of the RL algorithm and/or the second discriminator, feedback associated with the first realistic environment. The feedback associated with the first realistic environment that is received from the second discriminator preferably includes the determined difficult level correctness score and/or the determined correctness of the difficulty level. The environment generator is caused to generate another realistic environment, e.g., a second realistic environment, based on the feedback associated with the first realistic environment, e.g., see operation 316. Accordingly, the feedback received from the RL algorithm preferably includes the generated environment. For example, the feedback received from the RL algorithm may include the first realistic environment at time (t), which may be used by the environment generator as input to a next time step (t+1) in order to generate a second realistic environment. By the second realistic environment being generated based on the first realistic environment and the feedback obtained by the agent of the RL algorithm navigating the first realistic environment, the second realistic environment is generated with a refined difficulty that increases a relative probability that the agent of the RL algorithm receives rewards when navigating the second realistic environment. Looking to FIG. 3B, exemplary sub-operations for generating another realistic environment, e.g., a second realistic environment, a third realistic environment, a fourth realistic environment, etc., based on a most previously generated realistic environment and feedback obtained by processing the most previously generated realistic environment are illustrated in accordance with one embodiment, one or more of which may be used to perform operation 316 of FIG. 3A. However, it should be noted that the sub-operations of FIG. 3B are illustrated in accordance with one embodiment which is in no way intended to limit the invention.

In some preferred approaches, method 300 includes adding a predetermined degree of difficulty to a most previously generated realistic environment in response to a determination that the most previously generated realistic environment did not incorporate enough of a degree of difficulty. In contrast, method 300 preferably includes removing a predetermined degree of difficulty to a most previously generated realistic environment in response to a determination that the most previously generated realistic environment incorporated too much of a degree of difficulty. These determinations of whether the most previously generated realistic environment incorporated a sufficient degree of difficulty are in some approaches based on whether or not the agent of the RL algorithm received a reward as a result of performing the at least one operating while navigating the most previously generated realistic environment, e.g., see sub-operation 330. For example, in response to a determination that the agent did not receive a reward as a result of performing the at least one action on the first realistic environment, it may be determined that the first realistic environment incorporated too much of a degree of difficulty. It may be determined that the agent did not receive a reward as a result of performing the at least one action using the first realistic environment in response to any one or more determinations that, e.g., the feedback associated with the first realistic environment indicating that the degree of difficulty incorporated into the first realistic environment is incorrect, the numerical score of difficulty of the first realistic environment being a maximum numerical score such as 100% where the numerical score range is 0-100%, feedback received from the agent of the RL algorithm including an alert that an award was not received, etc. In response to a determination the agent did not receive a reward as a result of performing the at least one action using the first realistic environment, a predetermined degree of difficulty may be added to the first realistic environment during generation of the second realistic environment, e.g., see sub-operation 332. One or more known techniques for adding a predetermined degree of difficulty into a realistic environment may be implemented in such an operation.

Although various approaches above include modifying a degree of difficulty of a realistic environment based on the agent of the RL algorithm not receiving a reward, in some approaches, the degree of difficulty of a realistic environment may additionally and/or alternatively be adjusted despite the agent of the RL algorithm receiving a reward. For example, in some approaches, the actual reward is obtained by the agent of the RL algorithm as a result of the agent performing at least one action of the plurality of predetermined actions using the first realistic environment. It may be determined that the agent received a reward as a result of performing the at least one operation on the first realistic environment in response to any one or more determination that, e.g., the feedback associated with the first realistic environment indicating that the degree of difficulty incorporated into the first realistic environment is correct, the numerical score of difficulty of the first realistic environment not being a maximum numerical score such as 100% where the numerical score range is 0-100%, feedback received from the agent of the RL algorithm not including an alert that an award was not received, feedback received from the agent of the RL algorithm including an alert that an award was received, etc. It may additionally and/or alternatively determined whether the confidence score indicates that the degree of difficulty incorporated into the first realistic environment is incorrect and/or the numerical score of difficulty falls within at least one predetermined range of values, e.g., see sub-operation 334. In some approaches, generating the second realistic environment may include adding a predetermined degree of difficulty to the first realistic environment in response to a determination that the confidence score indicates that the degree of difficulty incorporated into the first realistic environment is incorrect and/or the numerical score of difficulty falls within at least one predetermined range of values, e.g., see sub-operation 336. One or more known techniques for adding a predetermined degree of difficulty into a realistic environment may be implemented in such an operation. In some approaches, a first of the predetermined range of values may be a bottom range of values that are associated with a degree of difficulty of a realistic environment being relatively too low. For example, assuming that the numerical score range is 0-100%, the first predetermined range may be 0-20%. In contrast, generating the second realistic environment may include subtracting a predetermined degree of difficulty from the first realistic environment in response to a determination that the confidence score indicates that the degree of difficulty incorporated into the first realistic environment is incorrect and/or the numerical score of difficulty falls within a predetermined range of values, e.g., a second predetermined range of values. One or more known techniques for removing a predetermined degree of difficulty into a realistic environment may be implemented in such an operation. The second predetermined range of values may be a top range of values that are associated with a degree of difficulty of a realistic environment being relatively too high. For example, assuming that the numerical score range is 0-100%, the second predetermined range may be 80-100%.

In some other approaches it may be determined that the confidence score indicates that the degree of difficulty incorporated into the first realistic environment is correct and/or the numerical score of difficulty does not fall within at least one predetermined range of values, e.g., the numerical score does not fall within a predetermined range that thereby indicates that a most recent degree of difficulty in the realistic environment should be modified. In response to a determination that the confidence score indicates that the degree of difficulty incorporated into the first realistic environment is correct and/or the numerical score of difficulty does not fall within at least one predetermined range of values, the most recent degree of difficulty in the realistic environment may optionally be maintained, e.g., see sub-operation 338.

The second realistic environment may be caused to be shared with the agent of the RL algorithm and the second discriminator. In such an operation, the second realistic environment is effectively a second iteration of various operations of method 300. Accordingly, the agent of the RL algorithm may navigate the second realistic environment and feedback associated with the second realistic environment may be received from the agent of the RL algorithm and the second discriminator. The environment generator may be caused to generate a third realistic environment based on the feedback associated with the second realistic environment. This process may be repeated a predetermined any number of times in order to generate realistic environments with a dynamically refined degree of difficulty. Accordingly, various operations may be utilized in order to generate simulated environment data, which is useful because challenging and appropriate environments are generated which may offer an appealing alternative for real world environment. Moreover, these techniques are appealing because and the policies trained in the simulation process may be transferred effectively into the real world with some existing additional devices and/or techniques, e.g., such as those described above in method 300.

Various benefits are enabled as a result of utilizing the techniques of various embodiments and approaches described herein. For example, as a result of performing one or more of the operations described in method 300 and/or FIG. 4, Q-learning gradually occurs as optimized steps are taken towards a target in a relatively faster pace than conventional RL environments which are prone to instead learning environments in random. This is at least in part because the techniques of various embodiments and approaches described herein mitigate the issues of conventional techniques described elsewhere herein by specifically ensuring that reward functions provide rewards to an agent of an RL algorithm by using a GAN to train a generator to create realistic environments and thereafter adjusting a degree of difficulty that is incorporated into generated realistic environments based on feedback of previous realistic environments that the agent considers. This furthermore trains the agent of the RL algorithm in a relatively shorter amount of time than would otherwise occur if the agent relied on navigating random environments generated by the environment generator in an attempt for the agent to obtain a reward. This should be distinguished from conventional real-world systems which are slow moving, fragile, expensive to run, and plagued by inefficiencies based on sparce rewards. Accordingly, as a result of utilizing the techniques of various embodiments and approaches described herein, efficiencies are created in computer devices, as relatively fewer data operations are performed as a result of the environment generator described herein being trained relatively quicker using the GAN. This training and these techniques further enable these efficiencies as a result of the implementation of an iteratively refined degree of difficulty being incorporated into realistic environments generated by the trained generator, which mitigates agents of the RL algorithm from resorting to random environments as a result from otherwise not obtaining a reward.

Figure 4:
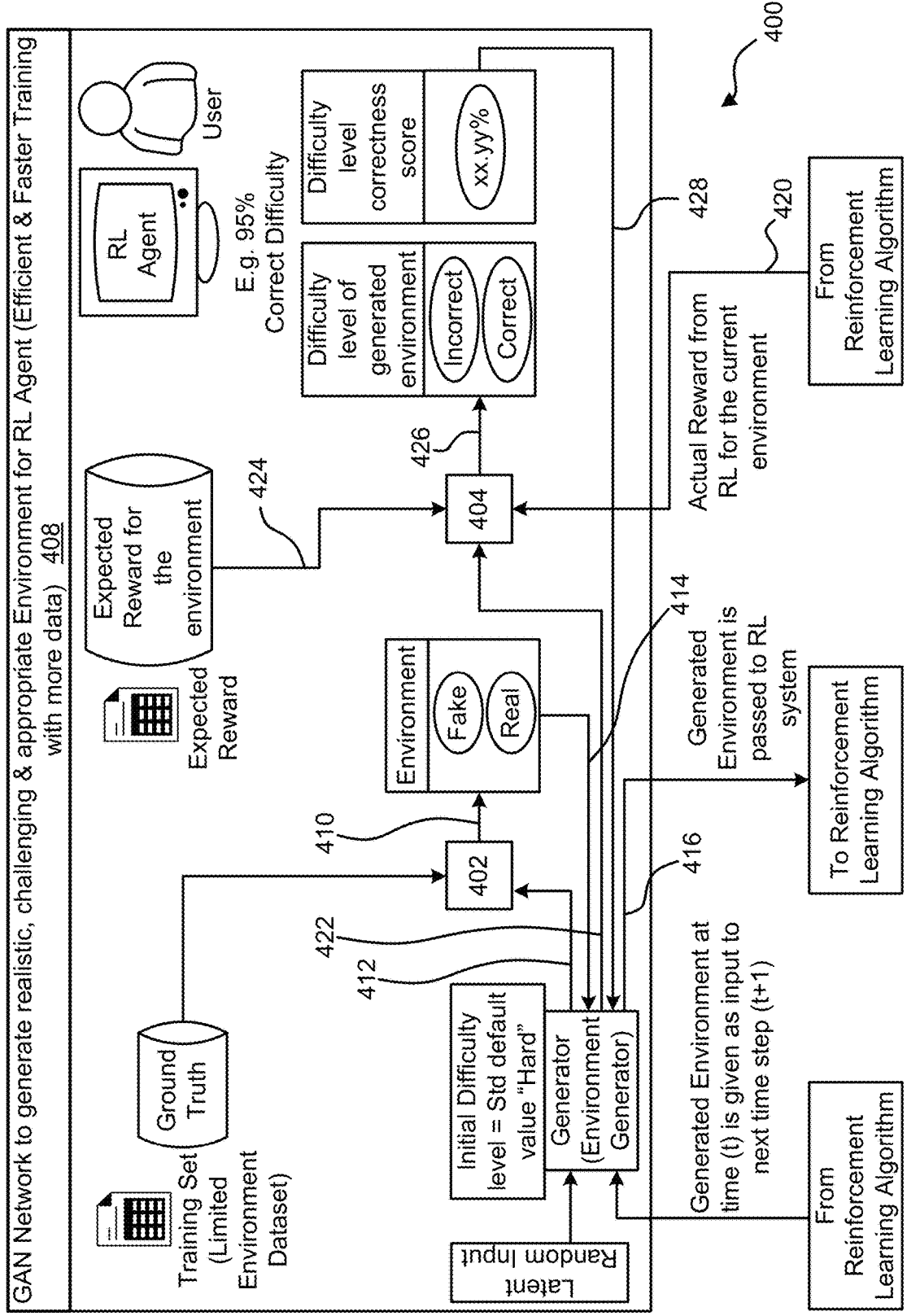
FIG. 4 is a representation of a system that includes a GAN and a RL algorithm, in accordance with one embodiment.
Figure 4:
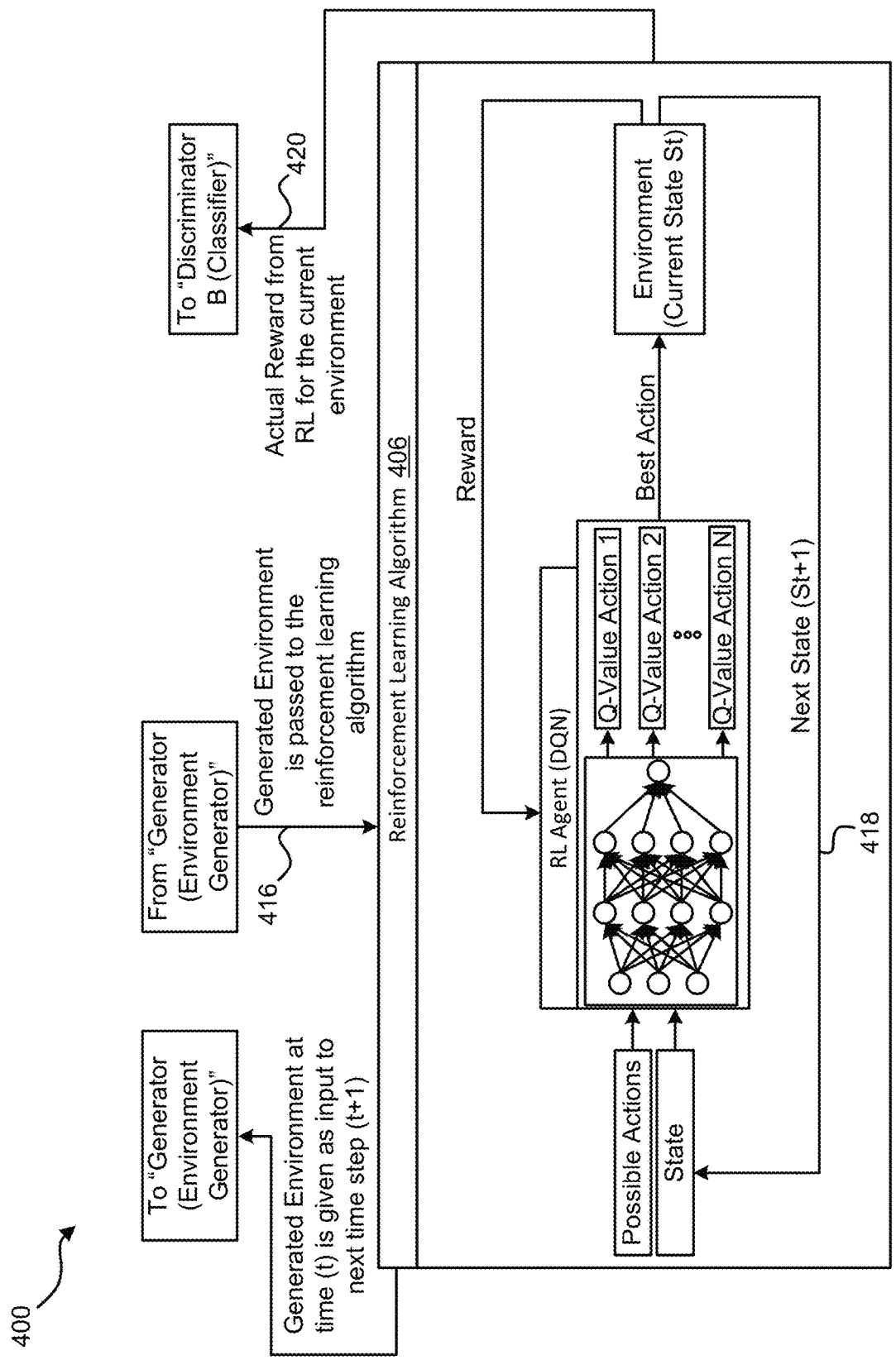

FIG. 4 depicts a system 400, in accordance with one embodiment. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment.

FIG. 4 represents a system 400 that includes a GAN and an RL algorithm. Various operations, e.g., some operations similar to those described in method 300, will now be described in accordance with system 400 according to an illustrative embodiment. Given a less competitive RL system trained with a limited amount of data due to real time environment data scarcity, various of the operations included in FIG. 4 include a novel technique to simulate additional real time environment data with an appropriate level of difficulty. This relatively decreases the amount of time that is consumed in training process of a generator by providing efficient and realistic training samples. The system includes two main modules, a new GAN and a GAN input conditioned RL system. Specifically, the GAN may be a staged GAN that is a new type of GAN that is built to generate realistic and challenging environments for RL agents to navigate in the current level. The new proposed GAN preferably includes one environment generator and two discriminators. The environment generator is preferably configured to perform at least two tasks in generating the realistic and appropriate environments. First the environment generator ensures that a new environment is created based on learning the distribution of the limited available real-world data set, thereby enriching the training data and making the RL agent more robust to a real-world challenging environment. Second the environment generator ensures that the appropriate level of difficulty is maintained in generating the environment, thereby tuning the difficulty level based on the current state of the RL agent. This ensures that the agent to receive a frequent reward feedback and decreasing the training process time. Furthermore, the discriminator is preferably configured to perform at least the two tasks of classifying the data and attempting to reduce the loss via backpropagation. The first discriminator may act as a classifier and ensures to validate whether the generated environment is real or fake. Furthermore, the first discriminator takes in the input of the real-world samples and the generated environment to classify the environment as real or fake. In contrast, the second discriminator takes in the input of expected reward and actual reward from the RL system for that current state of RL agent. The second discriminator compares the expected and actual reward and classifies whether the generated environment is of a correct difficulty level or not. Accordingly, the second discriminator first ensures to validate whether the generated environment data is of appropriate difficulty level for the current state. Then the second discriminator calculates a confidence score on the difficulty level of the generated environment based on the current state of the RL agent. The environment generator loss and discriminator losses may be backpropagated to the corresponding GAN modules and the training continues until the discriminator model is fooled about half the time, meaning the generator model is generating realistic and appropriate environments. For the GAN input conditioned RL system, the proposed RL system with Deep-Q Network differs with the regular RL network in the fact that it has an additional conditioned input from the Environment GAN. It takes in the realistic and appropriate environment generated by the GAN for the current level. Initially the RL agent interacts with the environment available from the limited dataset by setting the initial difficulty level to a predetermined standard default value and provides the reward feedback to the RL agent as well as to the environment generator of the GAN network. This reward is the actual reward of the RL system which acts as the main determinant of difficulty level produced by GAN. The second discriminator of the GAN network takes in the actual reward from the RL system and generates the new environment like the real-world data with the appropriate level of difficulty based on the feedback received and makes the generated environment as a new world for the RL agent to navigate.

With continued reference to FIG. 4, according to an illustrative embodiment, a generator of a GAN 408 is caused to generate an environment, e.g., see Generator (Environment Generator). In preferred approaches the environment is a realistic training environment that does not include a difficulty level incorporated therein other than an initial default level of difficulty, e.g., see Initial difficulty level=Std default value "Hard." A training set of data, e.g., see Training Set of a Limited Environment Dataset, may also be incorporated, e.g., as a Ground Truth, in the process of training the environment generator. The generated realistic training environment is considered by a first discriminator, e.g., see first discriminator 402, in operation 412. For example, in operation 410, the first discriminator 402 determines whether the training generated environment is Real or Fake. This determination is back propagated as feedback to the environment generator during the training process, e.g., see operation 414. In some approaches, known types of information such as generator loss and/or discriminator loss information may additionally and/or alternatively be considered by the first discriminator 402 and/or the environment generator. The first discriminator 402 thereby is in some approaches only used to train the environment generator to create a realistic environment. In other words, once the environment generator is able to create a realistic environment, the first discriminator 402 may no longer be used in operations of FIG. 4. During this training process, multiple real environment samples, e.g., generated realistic training environments, are used to train the environment generator to create the realistic environments.

Once the environment generator is trained to create realistic environments, a realistic environment is generated, e.g., hereafter the "generated environment," by the environment generator and passed from the environment generator to the RL algorithm 406, e.g., see operation 416. In the RL algorithm 406, a RL algorithm agent, e.g., see RL Agent (DQN), may work in the generated environment and as a result potentially achieve rewards. More specifically, the RL algorithm agent may perform multiple iterations of actions, e.g., see "Next State (St+1)" logical path return to State and Possible Actions of the RL algorithm agent in operation 418, in the generated environment of the RL algorithm 406 in order to achieve a maximum reward. More specifically, in each iteration of the actions performed, a reward may be achieved by the RL algorithm agent, e.g., see Reward, until it is determined that a maximum reward has been achieved. The RL algorithm is trained in such a way that even though there are multiple available paths from a state, e.g., a current state, the RL algorithm takes the path in which the reward is a maximum by comparing the rewards in the other path. To do this, the RL algorithm takes all the available path in each iteration, calculates the reward in each path, identifies the path having maximum reward and learns that path. It should be noted however, that in some approaches these iterations of actions are performed over time with respect to a plurality of realistic environments that are generated by the environment generator of the GAN and shared with the RL algorithm 406 for the agent to navigate. In other words, a first iteration includes an action being performed by the agent of the RL algorithm while the agent navigates the generated realistic environment. As described elsewhere herein, subsequent realistic environments may be generated, e.g., a second realistic environment, a third realistic environment, etc., based on feedback that is generated as a result of the agent of the RL algorithm navigating generated realistic environments. In some approaches, a Best Action is determined from a plurality of different predetermined actions in a current state of the generated environment, e.g., see Q-Value Action 1-Q-Value Action N pass to Environment (Current State St) in the RL algorithm 406. The Best Action may be determined from the plurality of different predetermined actions using known techniques. Actual rewards that are achieved from performing iterations of actions in the generated realistic environment are returned from the RL algorithm 406 to the GAN 408, e.g., see operation 420. In some approaches the actual reward may be returned via a feedback loop to a second discriminator 404 of the GAN 408 as a plurality of key points. For example, in some approaches the RL algorithm agent may obtain fifty out of one-hundred key points during one or more actions performed by the agent while navigating the realistic environment. The obtained fifty points may be passed as feedback to the second discriminator 404.

In operation 422, the generated environment is also passed to the second discriminator 404. The second discriminator 404 may act as a classifier in some approaches. More specifically, the second discriminator is configured to receive the generated environment from the environment generator, and receive the actual reward from the RL algorithm 406, which may be compared with an expected reward, e.g., see Expected Reward, for the realistic environment in operation 424. For example, in one approach the expected reward may be one-hundred points and the actual reward that has been obtained by the agent of the RL algorithm may be fifty points. In some approaches, the actual reward may be compared with the expected reward for the generated environment in order to determine a confidence score of the generated realistic environment which may include a determination whether a degree of difficulty incorporated into the realistic environment is correct, e.g., see the logical path 426 of the second discriminator 404 lead to a Difficulty level of generated environment. In some preferred approaches the confidence score may be determined based on results of the comparison using predetermined parameters and/or one or more predetermined formulas. For example, in a preferred approach, in response to a determination that the results of the comparison indicate that the actual reward and the expected reward for the generated environment are relatively close in value, e.g., key point value which may be utilized as a predetermined threshold of closeness, to one another, the degree of difficulty incorporated into the realistic environment may be determined to be correct, e.g., see Correct. In some other approaches, a value that is pre-associated with a difficulty level that is determined to be correct may be additionally an/or alternatively determined in response to a determination that the results of the comparison indicate that the actual reward and the expected reward for the generated environment are relatively close in value. Accordingly, in some approaches, the confidence score includes a numerical score of difficulty of the first realistic environment, e.g., see Difficult level correctness score. For example, a list that includes predetermined numerical scores that are each pre-associated with a difference in value between the actual reward and the expected reward for the generated environment may be referenced to determine numerical score of the confidence score. In contrast, in a preferred approach, in response to a determination that the results of the comparison indicate that the actual reward and the expected reward for the generated environment are not relatively close in value to one another, the degree of difficulty incorporated into the realistic environment may be determined to be incorrect, e.g., see Incorrect. In some other approaches, a numerical score that is pre-associated with a difficulty level that is determined to be incorrect may be additionally an/or alternatively determined in response to a determination that the results of the comparison indicate that the actual reward and the expected reward for the generated environment are not relatively close in value, e.g., see Difficult level correctness score. Feedback including the confidence score may be backpropagated to the environment generator, e.g., see operation 428. Note that in some approaches, known types of information such as generator loss and/or discriminator loss information may additionally and/or alternatively be considered by the second discriminator 404.

The environment generator uses the feedback received from the second discriminator 404 to generate a second realistic environment, e.g., a "next" realistic environment. The environment generator may additionally and/or alternatively use the most previously generated realistic environment that is most recently considered by the discriminators 402, 404, to generate the second realistic environment, e.g., see Generated Environment at time (t) is given as input to next time step (t+1). As a result of the second realistic environment being generated based on the previous realistic environment and the feedback obtained by processing the previous realistic environment, the second realistic environment is generated with a refined difficult such that the RL algorithm agent is able to receive rewards when performing actions in a realistic environment. For example, in response to a determination that the determined difficult level correctness score is greater than a predetermined top threshold, e.g., a threshold of difficult that the RL algorithm agent is not to experience more than, metrics used by the environment generator in order to generate the previous realistic environment may be adjusted for the subsequent generated realistic environment with the goal of obtaining a difficult level correctness score that is less than or equal to the predetermined top threshold. In some approaches, known techniques for incorporating a predetermined additional degree of difficulty into a generated realistic environment may be utilized in an effort to lower the difficult level correctness score of a next generated environment. In contrast, in some approaches, in response to a determination that the determined difficult level correctness score is less than a predetermined bottom threshold, e.g., a threshold of difficult that the RL algorithm agent is not to experience less than, metrics used by the environment generator in order to generate the previous realistic environment may be adjusted for the subsequent generated realistic environment with the goal of obtaining a difficult level correctness score that is greater than or equal to the predetermined bottom threshold. In some approaches, known techniques for incorporating a predetermined lesser degree of difficulty into a generated realistic environment may be utilized in an effort to increase the difficult level correctness score of a next generated realistic environment. These thresholds may be set and/or adjusted by one or more sources, e.g., a User using a user device such as an RL Agent that is in communication with the environment generator, an administrator using a user device that is in communication with the environment generator, a random number generator that is in communication with the environment generator (see Latent Random Input), a predetermined black box equation that is utilized by the environment generator, etc. This ensures that the difficulty level of generated realistic environments is not too large which otherwise may cause the environment generator to, as a result of the sparce rewards, begin generating random environments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    causing an environment generator of a Generative Adversarial Network (GAN) to generate realistic training environments;
    causing a first discriminator of the GAN to determine whether the realistic training environments are real or fake to train the environment generator to generate realistic environments;
    in response to a determination that an accuracy of the first discriminator at determining whether the realistic training environments are real or fake is within a predetermined range, causing the environment generator to generate a first realistic environment;
    causing the first realistic environment to be shared with an agent of a reinforcement learning (RL) algorithm and a second discriminator that is a different discriminator than the first discriminator;
    receiving, from the agent of the RL algorithm and the second discriminator, feedback associated with the first realistic environment,
    wherein the feedback includes a confidence score that includes a numerical score of difficulty incorporated into the first realistic environment; and
    causing the environment generator to generate a second realistic environment based on the feedback associated with the first realistic environment.

2. The computer-implemented method of claim 1, comprising:

causing the agent to perform at least one action of a plurality of predetermined actions using the first realistic environment to obtain an actual reward.

3. The computer-implemented method of claim 2, wherein the agent does not receive a reward as a result of performing the at least one action, wherein generating the second realistic environment includes: adding a predetermined degree of difficulty to the first realistic environment in response to a determination that the feedback indicates that the agent did not receive a reward as a result of performing the at least one action.

4. The computer-implemented method of claim 1, wherein the feedback is based on an actual reward obtained by the agent of the RL algorithm, wherein the confidence score includes a determination of whether a degree of difficulty incorporated into the first realistic environment is correct.

5. The computer-implemented method of claim 4, wherein generating the second realistic environment includes: adding a predetermined degree of difficulty to the first realistic environment in response to a determination that the confidence score indicates that the degree of difficulty incorporated into the first realistic environment is incorrect and/or the numerical score of difficulty falls within a predetermined range of values.

6. The computer-implemented method of claim 4, wherein generating the second realistic environment includes: subtracting a predetermined degree of difficulty from the first realistic environment in response to a determination that the confidence score indicates that the degree of difficulty incorporated into the first realistic environment is incorrect and/or the numerical score of difficulty falls within a predetermined range of values.

7. The computer-implemented method of claim 1, comprising:
   causing the second realistic environment to be shared with the agent of the RL algorithm and the second discriminator;
   receiving, from the agent of the RL algorithm and the second discriminator, feedback associated with the second realistic environment; and
   causing the environment generator to generate a third realistic environment based on the feedback associated with the second realistic environment.

8. A computer program product, the computer program product comprising a computer readable storage medium having program instructions embodied therewith, the program instructions readable and/or executable by a computer to cause the computer to:
   cause, by the computer, an environment generator of a Generative Adversarial Network (GAN) to generate realistic training environments;
   cause, by the computer, a first discriminator of the GAN to determine whether the realistic training environments are real or fake to train the environment generator to generate realistic environments;
   in response to a determination that an accuracy of the first discriminator at determining whether the realistic training environments are real or fake is within a predetermined range, cause, by the computer, the environment generator to generate a first realistic environment;
   cause, by the computer, the first realistic environment to be shared with an agent of a reinforcement learning (RL) algorithm and a second discriminator;
   receive, by the computer, feedback associated with the first realistic environment, wherein the feedback includes a confidence score that includes a numerical score of difficulty incorporated into the first realistic environment; and
   cause, by the computer, the environment generator to generate a second realistic environment based on the feedback associated with the first realistic environment.

9. The computer program product of claim 8, the program instructions readable and/or executable by the computer to cause the computer to: cause, by the computer, the agent to perform at least one action of a plurality of predetermined actions using the first realistic environment to obtain an actual reward.

10. The computer program product of claim 9, wherein the agent does not receive a reward as a result of performing the at least one action, wherein generating the second realistic environment includes: adding a predetermined degree of difficulty to the first realistic environment in response to a determination that the feedback indicates that the agent did not receive a reward as a result of performing the at least one action.

11. The computer program product of claim 8, wherein the feedback is received, by the computer, from the agent of the RL algorithm and the second discriminator and is based on an actual reward obtained by the agent of the RL algorithm, wherein the confidence score includes a determination of whether a degree of difficulty incorporated into the first realistic environment is correct.

12. The computer program product of claim 11, wherein generating the second realistic environment includes: adding a predetermined degree of difficulty to the first realistic environment in response to a determination that the confidence score indicates that the degree of difficulty incorporated into the first realistic environment is incorrect and/or the numerical score of difficulty falls within a predetermined range of values.

13. The computer program product of claim 11, wherein generating the second realistic environment includes: subtracting a predetermined degree of difficulty from the first realistic environment in response to a determination that the confidence score indicates that the degree of difficulty incorporated into the first realistic environment is incorrect and/or the numerical score of difficulty falls within a predetermined range of values.

14. The computer program product of claim 8, the program instructions readable and/or executable by the computer to cause the computer to:
   cause, by the computer, the second realistic environment to be shared with the agent of the RL algorithm and the second discriminator;
   receive, by the computer, from the agent of the RL algorithm and the second discriminator, feedback associated with the second realistic environment; and
   cause, by the computer, the environment generator to generate a third realistic environment based on the feedback associated with the second realistic environment.

15. A system, comprising:
   a processor; and
   logic integrated with the processor, executable by the processor, or integrated with and executable by the processor, the logic being configured to:
   cause an environment generator of a Generative Adversarial Network (GAN) to generate realistic training environments;

cause a first discriminator of the GAN to determine whether the realistic training environments are real or fake to train the environment generator to generate realistic environments;

in response to a determination that an accuracy of the first discriminator at determining whether the realistic training environments are real or fake is within a predetermined range, cause the environment generator to generate a first realistic environment;

cause the first realistic environment to be shared with an agent of a reinforcement learning (RL) algorithm and a second discriminator;

receive, from the agent of the RL algorithm and the second discriminator, feedback associated with the first realistic environment, wherein the feedback includes a confidence score that is based on an actual reward obtained by the agent of the RL algorithm, wherein the confidence score includes a numerical score of difficulty incorporated into the first realistic environment and a determination of whether a degree of difficulty incorporated into the first realistic environment is correct; and cause the environment generator to generate a second realistic environment based on the feedback associated with the first realistic environment.

16. The system of claim 15, the logic being configured to: cause the agent to perform at least one action of a plurality of predetermined actions using the first realistic environment to obtain an actual reward.

17. The system of claim 16, wherein the agent does not receive a reward as a result of performing the at least one action, wherein generating the second realistic environment includes: adding a predetermined degree of difficulty to the first realistic environment in response to a determination that the feedback indicates that the agent did not receive a reward as a result of performing the at least one action.

18. The system of claim 15, wherein generating the second realistic environment includes: adding a predetermined degree of difficulty to the first realistic environment in response to a determination that the confidence score indicates that the degree of difficulty incorporated into the first realistic environment is incorrect and/or the numerical score of difficulty falls within a predetermined range of values.

19. The system of claim 15, wherein generating the second realistic environment includes: subtracting a predetermined degree of difficulty from the first realistic environment in response to a determination that the confidence score indicates that the degree of difficulty incorporated into the first realistic environment is incorrect and/or the numerical score of difficulty falls within a predetermined range of values.

* * * * *